(12) United States Patent
Fox et al.

(10) Patent No.: US 9,266,199 B2
(45) Date of Patent: Feb. 23, 2016

(54) COPPER-TIPPED SLATS FOR LASER CUTTING

(71) Applicant: Fedtech, Inc., Mounds View, MN (US)

(72) Inventors: Dave J. Fox, Ham Lake, MN (US); Brent A. Erickson, Blaine, MN (US)

(73) Assignee: FEDTECH, INC., Mounds View, MN (US)

( * ) Notice: Subject to any disclaimer, the term of this patent is extended or adjusted under 35 U.S.C. 154(b) by 506 days.

(21) Appl. No.: 13/736,107

(22) Filed: Jan. 8, 2013

(65) Prior Publication Data

US 2014/0191459 A1   Jul. 10, 2014

(51) Int. Cl.
*B23K 37/04* (2006.01)

(52) U.S. Cl.
CPC ......... *B23K 37/0408* (2013.01); *B23K 26/702* (2015.10); *Y10T 29/49945* (2015.01)

(58) Field of Classification Search
CPC  Y10T 83/7587; Y10T 83/222; B65G 17/067; B65G 17/065; B23K 37/0408; B23K 37/04; B23K 26/422; B23K 26/0853; B23K 26/083
See application file for complete search history.

(56) References Cited

U.S. PATENT DOCUMENTS

| | | | |
|---|---|---|---|
| 3,828,159 A | 8/1974 | Zoot | |
| 3,828,697 A | 8/1974 | Egan | |
| 4,058,299 A * | 11/1977 | Lindkvist | 266/48 |
| 4,097,713 A * | 6/1978 | Dunshee | 219/121.39 |
| 4,112,797 A * | 9/1978 | Pearl | 83/177 |
| 4,121,816 A * | 10/1978 | Eads | 269/296 |
| 4,441,934 A * | 4/1984 | Kawakami | 219/121.44 |
| 5,132,510 A * | 7/1992 | Klingel et al. | 219/121.82 |
| 5,167,903 A * | 12/1992 | Anderson | 266/49 |
| 5,227,606 A * | 7/1993 | Weeks et al. | 219/121.67 |
| 5,372,246 A * | 12/1994 | van Aalst | 198/692 |
| 5,481,083 A | 1/1996 | Smyth, Jr. | |
| 5,560,887 A | 10/1996 | Roy et al. | |
| 5,632,915 A * | 5/1997 | Schnetzer et al. | 219/121.82 |
| 5,637,243 A | 6/1997 | Sato et al. | |
| 6,028,287 A * | 2/2000 | Passage et al. | 219/121.56 |
| 6,055,894 A | 5/2000 | Balz et al. | |
| 6,095,025 A * | 8/2000 | Mirabello | 83/177 |
| 6,128,546 A * | 10/2000 | Basista et al. | 700/166 |
| 6,218,639 B1 * | 4/2001 | Bulle | 219/121.39 |
| 6,222,155 B1 * | 4/2001 | Blackmon et al. | 219/121.39 |
| 6,387,320 B1 * | 5/2002 | Poulin et al. | 266/49 |
| 7,161,114 B2 | 1/2007 | Zeygerman | |
| 7,759,608 B2 * | 7/2010 | LeMasson | 219/121.82 |

(Continued)

FOREIGN PATENT DOCUMENTS

| | | |
|---|---|---|
| EP | 0857098 | 8/1998 |
| EP | 1585615 | 9/2008 |

(Continued)

*Primary Examiner* — Lee D Wilson
*Assistant Examiner* — Tyrone V Hall, Jr.
(74) *Attorney, Agent, or Firm* — Nikolai & Mersereau, P.A.; Thomas J. Nikolai

(57) ABSTRACT

Improved slats for cutting tables are provided by forming from steel elongate receiver plates having a plurality of receiver slats and forming from copper a plurality of insert members. The insert members each have an interlocking section and a tip section. The interlocking sections of the insert members are mated and pressed into the receiver slots so the tip sections extend above the top of the receiver plates and are able to support a work piece above and away from the receiver plates during a cutting operation.

7 Claims, 3 Drawing Sheets

(56) References Cited

U.S. PATENT DOCUMENTS

| | | | |
|---|---|---|---|
| 7,998,398 B2 | 8/2011 | Sunderman et al. | |
| 2004/0144762 A1* | 7/2004 | Franz et al. | 219/121.82 |
| 2005/0233076 A1* | 10/2005 | Hsu et al. | 427/226 |
| 2007/0246353 A1 | 10/2007 | Soroushian et al. | |
| 2010/0064870 A1* | 3/2010 | Olsen | 83/177 |

FOREIGN PATENT DOCUMENTS

| | | |
|---|---|---|
| EP | 1278610 | 6/2010 |
| EP | 2346653 | 9/2011 |
| EP | 2255914 | 5/2012 |

* cited by examiner

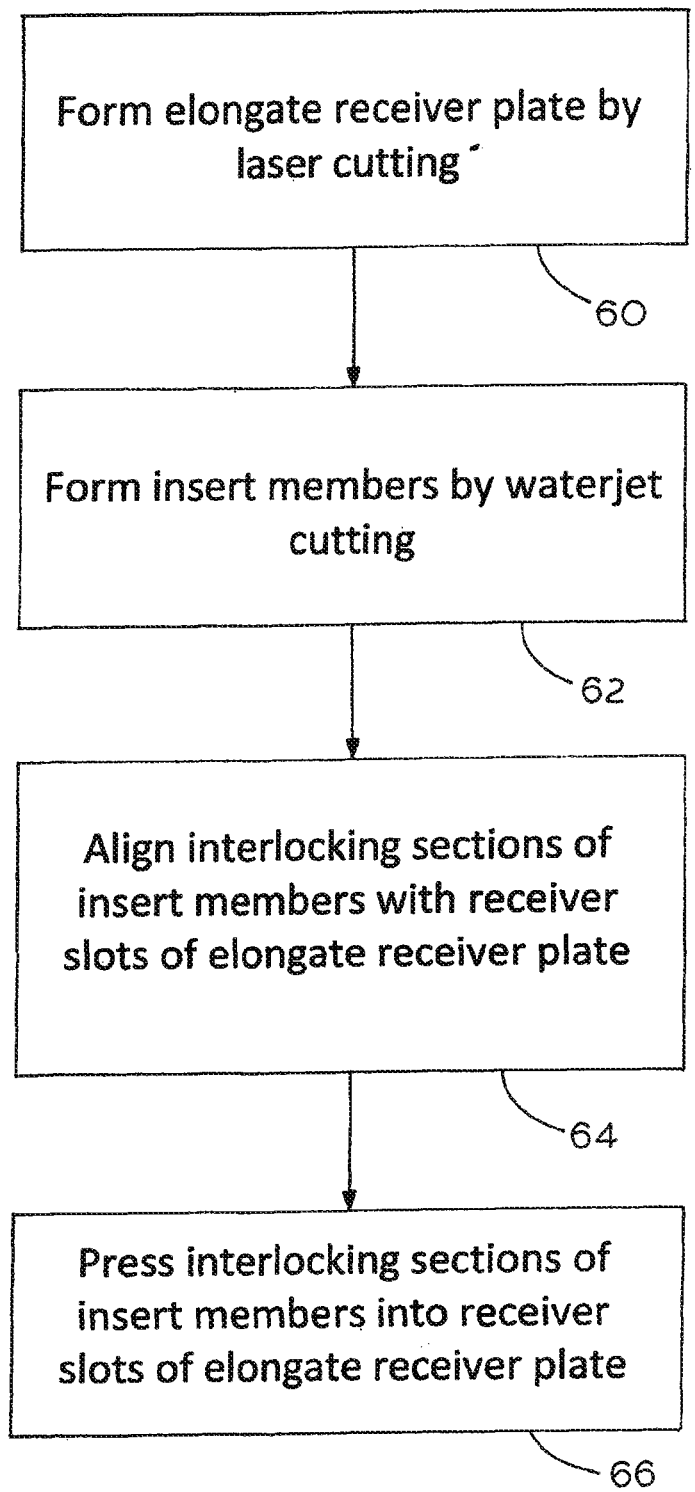

COPPER-TIPPED SLATS FOR LASER CUTTING

CROSS-REFERENCED TO RELATED APPLICATIONS

Not applicable.

STATEMENT REGARDING FEDERALLY SPONSORED RESEARCH OR DEVELOPMENT

Not applicable.

BACKGROUND OF THE INVENTION

I. Field of the Invention

The present invention relates generally to devices used to support a metal plate or other object as it is being cut using a laser or waterjet cutter. More particularly, the present invention relates to slats used to form a support surface for supporting such a metal plate or object.

II. Description of the Prior Art

Laser and waterjet cutting workstations typically include a table upon which a work piece may be placed and supported. Such devices typically include a plurality of slats, a grid made up of honeycomb-shaped cells or the like. Such devices support the work piece beneath the laser or waterjet during a cutting operation. When a plurality of slats are used, the upper surfaces of such slats are relatively thin, the goal being to prevent the support surface from being damaged by the laser or waterjet after the item to be cut has been perforated.

In the prior art, slats have typically been made out of steel or copper. Steel slats offer the advantage of being relatively low in cost. The disadvantage of using steel to form a slat is that slag generated during the cutting operation will stick to the steel surfaces of the slats making the slats unusable after a very short period of time. While this is not as significant of a problem with copper slats, the high cost of copper drives many away from using slats made cut of copper. Thus, there is a real need to have a slat which is low cost like a steel slat and offers the solution to the slag problem like a copper slat.

Various attempts have been made in the prior art to achieve the low cost of steel or aluminum slats and, at the same time, obtain the benefits derived from using copper. For example, U.S. Pat. No. 5,167,903 to Anderson granted on Dec. 1, 1991 discloses a plurality of support bars having lugs which extend from the upper edge of the support bars and caps covering the lugs. The Anderson patent also describes the use of support bars having an upper edge covered by a conductive cap. The Anderson patent suggests that copper may be employed as the conductive cap. European Patent Publication No. EP2255914 B1 dated May 23, 2012 by Jorg Buchmüller describes support bars with a plurality of raised elements. Specifically, Buchmüller describes these support bars as comprising a steel strip supporting steel sleeves. Copper pins or pegs are inserted into and supported by the steel sleeves to join the copper pins to the steel strip. Adding such sleeves to the support bars, of course, increases the cost of the support bars. Further, the sleeves increase the overall thickness of the slat which can create other issues when cutting.

SUMMARY OF THE INVENTION

To overcome the deficiencies of the prior art, novel slats for supporting work pieces are provided. Each slat comprises an elongated receiver plate made of a first material and having a top edge, a bottom edge, a first front surface, a first back surface and a plurality of receiver slots spaced along the receiver plate. Each of the receiver slots extends between the first front surface and the first back surface of the plate. Each of the receiver slots also extends from the top edge of the elongated receiver plate toward the bottom edge and is defined by an inner engagement surface having a plurality of first locking sections. The inner engagement surface extends between the front surface and back surface at a first draft angle.

The novel slat also includes a plurality of insert members. Each insert member is made of copper and comprises a tip section and an interlocking section. The interlocking section comprises a second front surface, a second back surface, and an outer engagement surface extending between the second front surface and the second back surface at a second draft angle. The outer engagement surface has a shape corresponding to the shape of the inner engagement surface of the receiver slots of the elongated receiver plate and includes second locking sections. The outer engagement surface and receiver slots can have any of various shapes. What is important is that the receiver slot and the outer engagement surface have corresponding shapes.

The insert members are coupled to the receiver plate by mating the interlocking sections of the insert members to the receiver slots. When so mated, the tip sections of the insert members extend beyond the top edge of the receiver plate such that tip sections can support a work piece above the top edge of the elongate receiver plate. The tips thus serve to hold the work piece away from the top edge of the elongate receiver plate such that slag or the like which may accumulate on that plate does not interfere with the ability of the slats to properly support a work piece during the cutting operations or continued use of the slat.

The elongate receiver plate may be made of carbon steel. Carbon steel selected from a group consisting of A1011 carbon steel and A36 carbon steel may, for example, be used. The copper used to form the insert members may be made of Alloy 110 copper by way of example.

One method for constructing a slat for supporting work pieces includes forming an elongate receiver plate by laser cutting a carbon steel sheet. More specifically, the laser precisely cuts the carbon steel sheet to provide an elongate receiver plate having a top edge, a bottom edge, a first front surface, a first back surface, and a plurality of receiver slots spaced along the receiver plate. Each of the receiver slots extends between the front surface and the back surface and from the top edge toward the bottom edge of the elongate receiver plate. The shape of the receiver slot is defined by an inner engagement surface having a plurality of first locking sections and extending between the first front surface and the first back surface at a draft angle. The use of laser cutting to form the elongate receiver plate results in the inner engagement surface having striations with interstices such as, by way of example, a rough sawtooth pattern.

A plurality of insert members is cut from a copper sheet using waterjet cutting. Each insert is precisely formed through such waterjet cutting operation so that it comprises a tip section and an interlocking section. The inner locking section comprises a second front surface, a second back surface, and an outer engagement surface extending between the front surface and the back surface at a second draft angle. The outer engagement surface is cut to a shape corresponding to the shape of the inner engagement surface such that the outer engagement surface of the insert member defines interlocking sections. Because a waterjet is used to cut the copper, the outer engagement surface is somewhat porous. The insert members can be formed so that the front surface of the insert member has an area slightly larger than the area of the cross-section of the receiver slots. For example, the second front surface of the insert members can be one percent to three percent larger than the area of a cross-section of the receiver slots.

To complete the fabrication of the slats, the insert members are aligned with the receiver slots so the interlocking sections of the insert members and the locking sections of the receiver slots are aligned and the tip sections of the insert members extend above the top edge of the receiver plate. Using a press, the interlocking sections of the insert members are then forced into the aligned receiver slots to join the insert members to the elongate receiver plate such that the tip section can support a work piece above the top edge of the elongate receiver plate. The press can provide a force in the range of 35-45 tons. This, in combination with the nature of the inner engagement surface and outer engagement surface, causes the copper along the outer engagement surface to become embedded with the interstices of the inner engagement surface thereby joining the insert members to the receiver plate.

A complete understanding of the invention will be obtained from the following description when read in conjunction with the accompanying drawings.

BRIEF DESCRIPTION OF THE DRAWINGS

FIG. 5 is a flow chart illustrating the method of manufacturing the slat of FIGS. 1-4.

DETAILED DESCRIPTION

Figure 1:
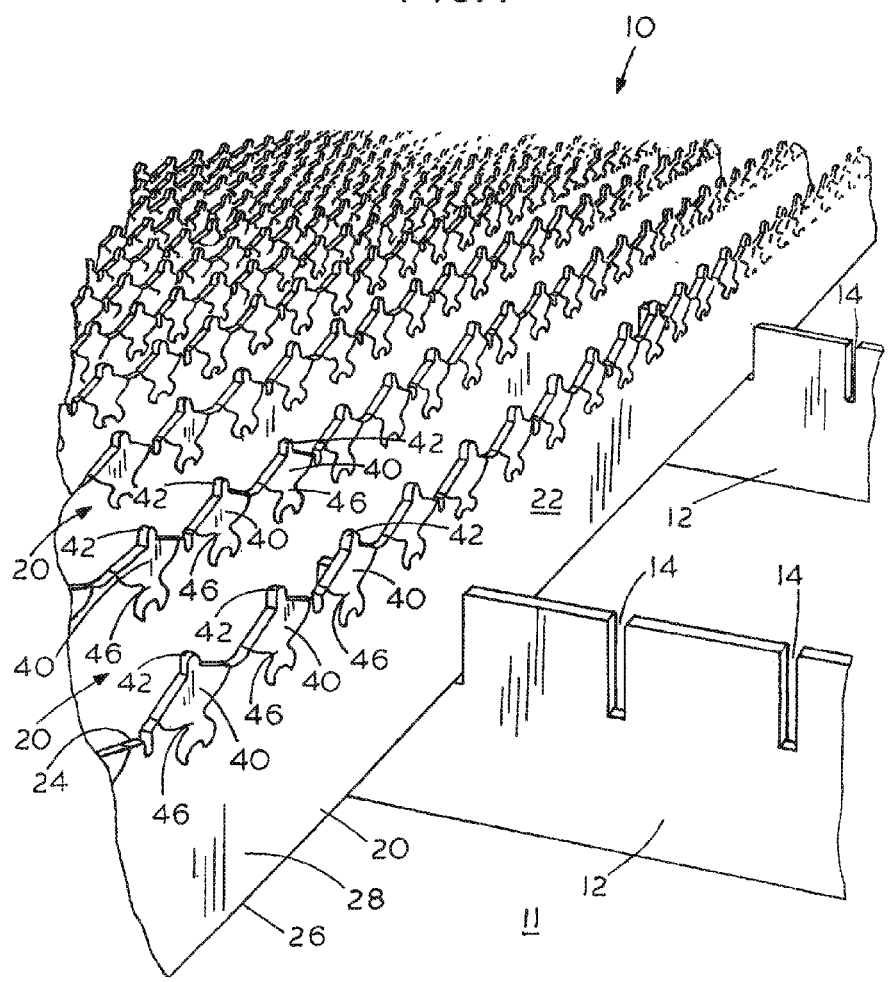
FIG. 1 is a perspective view showing a plurality of slats forming a support structure for a work piece.

FIG. 1 shows a table 10 used to support a sheet of steel or other object as it is subjected to a waterjet or laser-cutting operation. The table includes a plurality of support structures 12 extending upwardly from a base 11. These support structures have aligned, spaced-apart slots 14 into which slats 20 are inserted and held in an upright, spaced-apart relation.

Each of the slats 20 comprises an elongate receiver plate 22. Various materials can be used to form the receiver plate. By way of example, carbon steel or more particularly carbon steel selected from a group consisting of A1011 carbon steel and A36 carbon steel, may be used. The receiver plate 22 has a top edge 24 and a bottom edge 26. The receiver plate also has a first front surface 28 and a first back surface substantially parallel to the front surface 28. As illustrated in FIG. 1, the bottom edge 26 is inserted into an aligned set of slots 14 and supports 12 such, that the front and back surfaces of the elongate receiver plate are sandwiched between the walls forming the slots 14. The elongated receiver plate also has a plurality of receiver slots 30. The shape of the individual receiver slots is best illustrated in FIG. 3.

Figure 3:
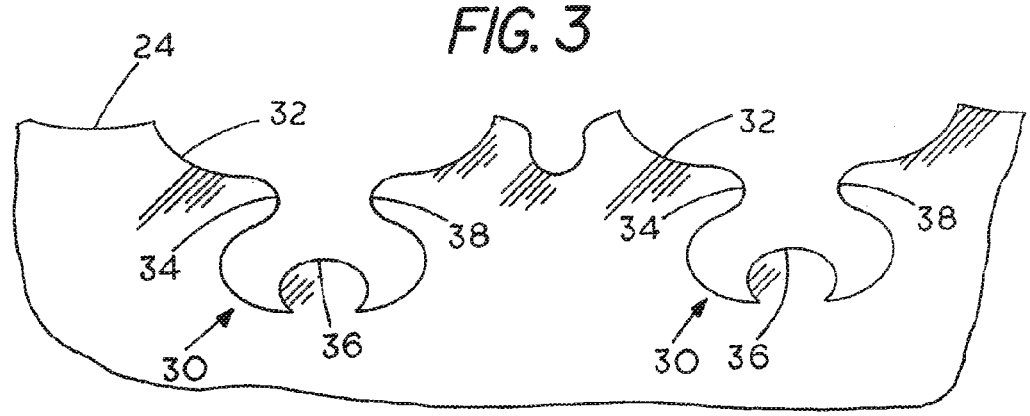
FIG. 3 is a partial plan view showing the shape of the receiver slots.

As shown in FIG. 3, each receiver slot 30 extends from the front surface 28 toward the back surface through the entire thickness of the receiver plate. Each receiver slot 30 also extends from the top edge 24 toward the bottom edge. Each receiver slot is defined by an inner engagement surface 32. The inner engagement surface is shaped to include a plurality of first locking sections. The first locking sections include first locking section 34, first locking section 36, and first locking section 38. The inner engagement surface 32 is at a first draft angle relative to the front surface 28 of the elongate receiver plate. More specifically, the engagement surface is angled so that the receiver slot is larger immediately adjacent the front surface 28 when it is immediately adjacent the back surface of elongate receiver plate 22.

Referring back to FIGS. 1 and 2, the slats 20 also include a plurality of insert members 40. Each insert member is made of copper. More specifically, a copper alloy such as Alloy 110 copper may be used to form the insert members 40.

Figure 4:
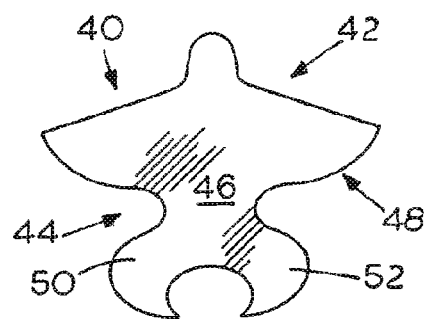
FIG. 4 is a plan view showing the shape of the insert members.

As best illustrated in FIG. 4, each insert member comprises a tip section 42 and an interlocking section 44. The interlocking section comprises a second front surface 46, a second back surface, and an outer engagement surface 48 extending between the front surface 46 and the back surface. The back surface is substantially planar and is substantially parallel to the front surface 46. The engagement surface 48 of the insert members 40 also extends at a draft angle relative to the front surface 46 of the insert member 40. The second draft angle between the front surface and back surface of the insert members is matched to the draft angle between the first front surface and first back surface of the receiver slots of the elongated receiver plate. More specifically, the area of the front surface of the insert member is slightly larger than the area of the back surface of the insert member to provide a draft similar to the first draft angle of the inner engagement surface of the receiver slots.

The outer engagement surface 48 of the insert members 40 also provides a shape corresponding to the shape of the inner engagement surface defining the receiver slots 30 in the elongate receiver plate 22. As such, the insert members include second locking sections, e.g., 50 and 52.

Figure 2:
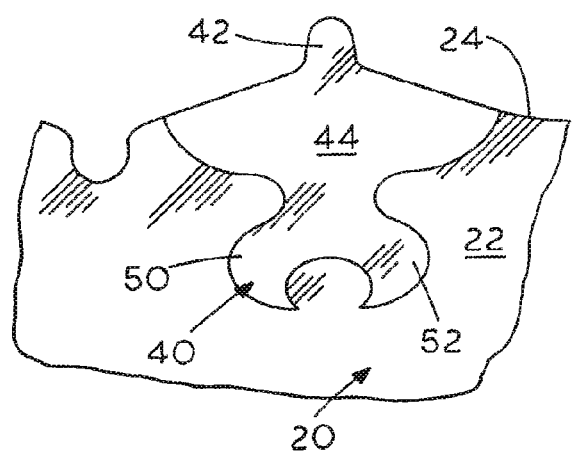
FIG. 2 is a partial plan view of one of the slats showing an insert member coupled to the elongate receiver plate.

As illustrated in FIGS. 1 and 2, the insert members 40 are coupled to the elongate receiver plate 22 by mating the interlocking sections 44 of the insert members 40 to the receiver slots 30 of the elongate receiver plate 22. Given the shape of the insert members 40 and receiver slots 30 shown, one skilled in the art will appreciate that the insert members 40 are so mated from the front surface 28 rather than the top edge 24 of the receiver 22. When so mated, the tip sections 42 of the insert members 40 extend beyond the top edge 24 of the elongate receiver plate 22. Thus, when the slats are positioned as shown in FIG. 1, the tip sections 42 of the insert members 40 extend beyond the top edge 24 of elongate receiver plates 22 such that the tip sections 42 can support a work piece above the top edge 24 of elongate receiver plate 22.

As illustrated in FIG. 5, slats 20 of the type shown in FIGS. 1-4 are manufactured through a multi-step process. At step 60, the elongate receiver plate 22 of a slat 20 is formed from a carbon steel sheet by laser cutting. During the laser cutting operation, the elongate receiver plate 22 is formed to include a top edge 24, a bottom edge 26, a first front surface 28, a first back surface, and a plurality of receiver slots 30. The receiver slots 30 are spaced along the receiver plate 22. As described above, each receiver slot 30 extends between the front surface 28 and the back surface from the top edge 24 toward the bottom edge 26 and is defined by an inner engagement surface 32. The inner engagement surface 32 has a plurality of first locking sections, 34, 36, and 38 and extends between the front surface 28 and the back surface at a first draft angle. Cutting the elongate receiver plate from a carbon steel sheet using a laser generally results in the inner engagement surface being formed with striations having interstices.

At step 62, the insert members 40 are formed. The insert members are formed from a copper sheet by waterjet cutting. Each insert member 40 is formed to include a tip section 42 and an interlocking section 44. As noted above, the interlocking section 44 comprises a front surface 46, a back surface, and an outer engagement surface 48 extending between the second front surface and the second back surface at a second draft angle. The outer engagement surface has a shape corresponding to the shape of the inner engagement surface 32 of the receiver slots 30. The outer engagement surface also provides second locking sections 50 and 52. The outer engagement surface 48 is somewhat porous by virtue of the fact that the insert members 40 are cut from copper using a waterjet cutting technique.

After the elongate receiver plate in the insert members have been formed at steps 60 and 62, the insert members 40 are aligned with the receiver slots 30 of the elongated receiver plate 22 at step 64. More specifically, the interlocking sections 44 of the insert members 40 are aligned with the receiver slots 30 of the elongate plate 22 such that the tip sections 42 extend beyond the top edge 24 of the elongate receiver plate 22. Once so aligned, the insert members 40 are press-fit into the receiver slots 30 at step 66.

More specifically, at step 66, a press may be used to force the insert members 40, either individually or all at one time, into the aligned receiver slots 30. This serves to join the insert members 40 to the elongate receiver plate 22 such that the tip section 42 of each insert member extends above the top edge 24 of the elongate receiver plate so that the tip sections 42 of the various slats 20 can cooperate to hold a sheet of metal or other work piece to be cut using laser or waterjet cutting above. The tip sections 42 hold the sheet of metal or other item to be cut out of contact with the steel elongate receiver plates. By way of example, a press operating in a pressure range of between 35 and 45 tons can effectively force the insert members 40 into the receiver plate 22. A press operating in other pressure ranges may also be employed without deviating from the invention. As pressure is applied, copper along the outer engagement surface 48 becomes embedded within the interstices of the inner engagement surface 32 to thereby join or bond the insert member 40 to the receiver plate. To permit proper alignment and achieve such a bond, the second front surface, i.e., the front surface 46 of the insert members 40 has an area larger than the area of a cross-section of the receiver slots 30. For example, the area of the second front surface may be one percent to three percent larger than the area of a cross-section of the receiver slots prior to the pressing operation to provide a proper bond.

Slats formed as described above offer several advantages. First, they are generally lower in cost than a slat made entirely out of copper. Likewise, issues with slag building up on the steel are ameliorated because the material to be cut is held above the steel by the tip sections 42 of the copper insert members 40. All of this is achieved without increasing the width of the slats along the edges and a secure bond is formed between the elongate receiver plate 22 and insert members 40 of the slats providing a highly effective and low cost slat 20.

The description provided above of the slats themselves and the method of manufacture are provided by way of example only. It is not intended that this description in any way be limiting. Instead, the invention includes all variations thereof within the scope of the following claims.

What is claimed is:

1. A slat for supporting a work piece comprising:
   (a) An elongate receiver plate made of a first material and having a top edge, a bottom edge, a first front surface, a first back surface and a plurality of receiver slots spaced along the receiver plate, each of the receiver slots extending from the first front surface toward the first back surface and from the top edge toward the bottom edge, and defined by an inner engagement surface having a plurality of first locking sections extending from the first front surface toward the first back surface at first draft angle; and
   (b) A plurality of insert members, each insert member made of copper and comprising a tip section and an interlocking section, the interlocking section comprising a second front surface, a second back surface, and an outer engagement surface extending between the second front surface and the second back surface at a second draft angle and having a shape corresponding to the shape of the inner engagement surface and including second locking sections, wherein the insert members are coupled to the receiver plate by mating from the first front surface of the elongate receiver plate the interlocking sections of the insert members to a receiver slots such that when so mated the tip sections of the insert members extend beyond the top edge of the receiver plate such that the tip sections can support a work piece above the top edge of the elongate receive plate.

2. The slat of claim 1 wherein the elongate receiver plate is made of carbon steel.

3. The slat of claim 2 wherein the carbon steel is selected from a group consisting of A1011 carbon steel and A36 carbon steel.

4. The slat of claim 1 wherein the copper is Alloy 110 copper.

5. The slat of claim 1 wherein the first draft angle and the second draft angles are matched.

6. The slat of claim 1 wherein the inner engagement surface is striated with interstices and the outer engagement surface is porous.

7. The slat of claim 6 wherein some of the copper along the outer engagement surface is within the interstices of the inner engagement surface after an insert member is mated to the receiver plate joining the insert member to the receiver plate.

* * * * *